(12) United States Patent
Haas et al.

(10) Patent No.: US 7,298,529 B2
(45) Date of Patent: Nov. 20, 2007

(54) METHOD AND SYSTEM FOR IMAGING A TRANSPARENT MEDIA OBJECT

(75) Inventors: William R. Haas, Fort Collins, CO (US); Kirk S. Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 10/455,845

(22) Filed: Jun. 6, 2003

(65) Prior Publication Data

US 2004/0246542 A1    Dec. 9, 2004

(51) Int. Cl.
H04N 1/04    (2006.01)

(52) U.S. Cl. .................. 358/487; 358/483; 358/482; 358/506; 358/474; 358/497

(58) Field of Classification Search ............. 358/487, 358/506, 483, 482, 512–514, 474, 505; 280/208.1, 280/239, 216, 234–236; 355/40, 41; 399/211
See application file for complete search history.

(56) References Cited

U.S. PATENT DOCUMENTS

| | | | | |
|---|---|---|---|---|
| 5,483,359 | A * | 1/1996 | Yumiba et al. | 358/513 |
| 5,555,107 | A * | 9/1996 | Funada et al. | 358/518 |
| 5,570,206 | A * | 10/1996 | Yoshinaga | 358/497 |
| 6,593,968 | B1 * | 7/2003 | Ichikawa | 348/324 |
| 6,965,463 | B1 * | 11/2005 | Moritaku et al. | 358/513 |
| 6,972,879 | B2 * | 12/2005 | Ide | 358/514 |
| 7,149,012 | B2 * | 12/2006 | Fang et al. | 358/497 |
| 7,190,493 | B2 * | 3/2007 | Maki et al. | 358/461 |
| 2004/0070795 | A1 * | 4/2004 | Tseng | 358/474 |

FOREIGN PATENT DOCUMENTS

| | | |
|---|---|---|
| JP | 51-86330 | 7/1976 |
| JP | 54-048116 | 4/1979 |
| JP | 58-127467 | 7/1983 |
| JP | 61131672 A | 6/1986 |
| JP | 05-030305 | 2/1993 |
| JP | 05-199369 | 8/1993 |
| JP | 09-130548 | 5/1997 |
| JP | 3080372 | 7/2001 |
| JP | 2001-313786 | 11/2001 |

OTHER PUBLICATIONS

English translation of Japanese Office Action dated Jul. 12, 2006.
English translation of Japanese Office Action dated Feb. 7, 2006.
Search Report (UK Patent Office) dated Sep. 30, 2004; 3 pgs.

* cited by examiner

Primary Examiner—Cheukfan Lee

(57) ABSTRACT

A scanner system for imaging a transparent media object comprising an illumination source for concurrently illuminating a first and second scan line of a media object, and a carriage comprising a photosensitive device located within the carriage and a light pipe affixed to a surface of the carriage is provided. The carriage is configured to receive on a first region of the photosensitive device light passed through the first scan line and the light pipe is adapted to redirect light passing through the second scan line onto a second region of the photosensitive device. The photosensitive device is operable to sample light directed onto the first and second regions.

20 Claims, 4 Drawing Sheets

METHOD AND SYSTEM FOR IMAGING A TRANSPARENT MEDIA OBJECT

BACKGROUND OF THE INVENTION

Document scanners convert a visible image on a media object, such as and not by way of limitation, a document, photograph or a transparent media, into an electronic form suitable for copying, storing and processing by a computer. A document scanner may be a stand-alone device or integrated with a copier, a facsimile machine, a digital sender, or a multifunction device. Documents, or media objects, to be scanned may generally be classified as either transparent or opaque.

For scanning opaque media, light is reflected off an image on the surface of the document onto a photosensitive device by a process referred to as a reflective scan. The photosensitive device converts received light intensity into one or more electric signals. Transparent media are scanned by passing light therethrough, rather than reflecting the light off, the media. The transmitted light is received by an optics system and directed onto the photosensitive device. Transparent media may include either positive or negative images.

Document scanning systems operable to scan both transparent and opaque documents are available. Some conventional scanners include a separate light source to backlight the image on the transparent media.

In conventional scanner systems, the light projected onto the transparent media is only focused on a center section of the photosensitive device. Distal sections on both sides of the center section are typically unused for the most common transparent media object sizes.

SUMMARY OF THE INVENTION

Heretofore, a technique and apparatus for imaging two distinct areas of a transparent media and directing light from one of the two distinct scanned areas onto a distal region of the photosensitive device has not been provided. In accordance with an embodiment of the present invention, a method of imaging a transparent media object comprising passing light through a first scan line of the transparent media object and focusing the light passed through the first scan line onto a first region of a photosensitive device is provided. Light is passed through a second scan line of the transparent media object substantially concurrently with passage of the light passed through the first scan line and focused onto a second region of the photosensitive device.

In accordance with another embodiment of the invention, a scanner system for imaging a transparent media object comprising an illumination source for concurrently illuminating a first and second scan line of a media object, a carriage comprising a photosensitive device located within the carriage, and a light pipe affixed to a surface of the carriage is provided. The carriage is configured to receive, on a first region of the photosensitive device, light passed through the first scan line, and the light pipe is adapted to redirect light passing through the second scan line onto a second region of the photosensitive device. The photosensitive device is operable to sample light directed onto the first and second regions.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figure 1:
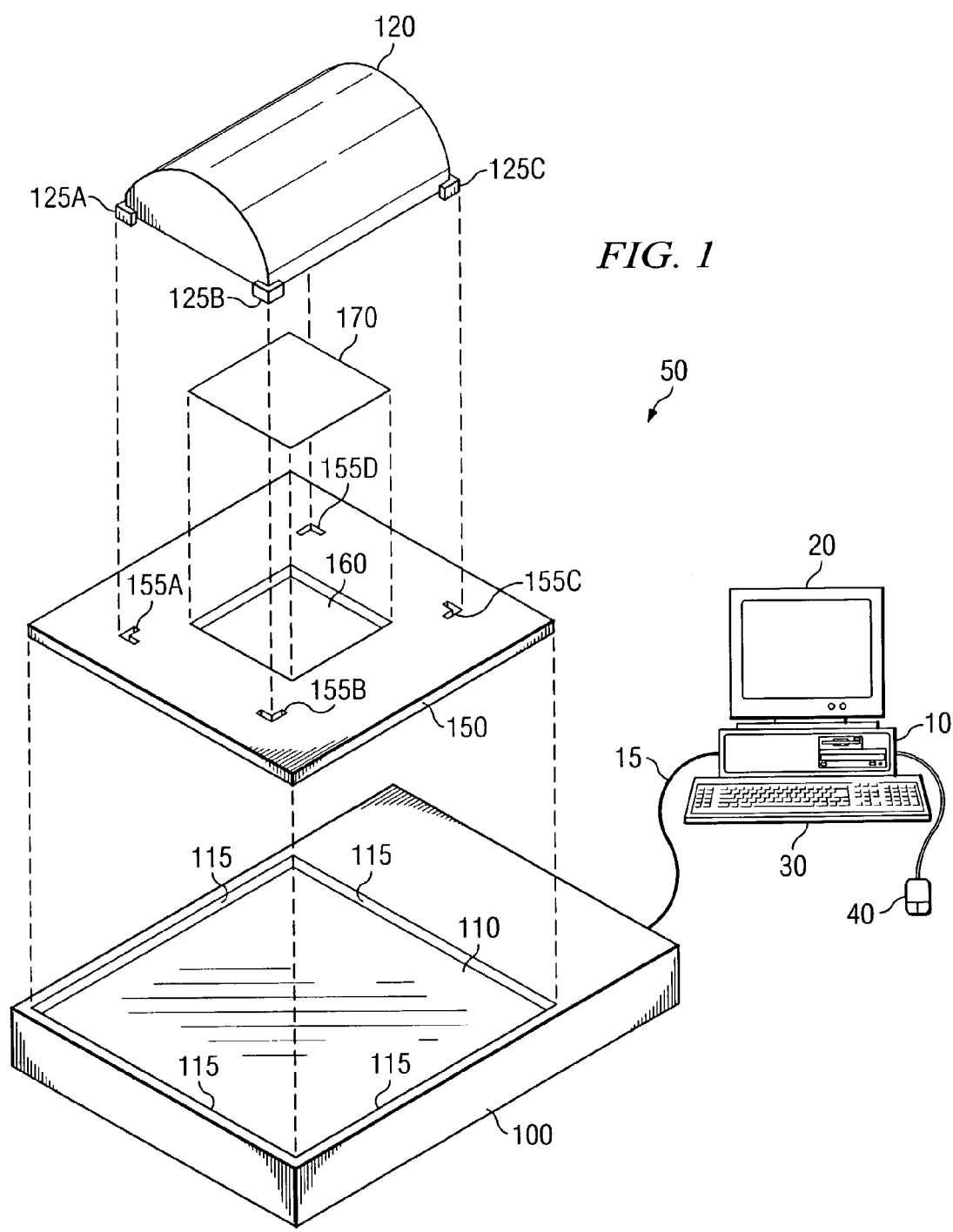
FIG. 1 is a scanner system connected to a computer and operable to scan images on a transparent media object and in which embodiments of the present invention may be implemented for advantage.

Referring to FIG. 1, a scanner system 50 is coupled to a computer 10 and operable to scan images on both opaque and transparent media and in which an embodiment of the present invention may be implemented advantageously. Scanner system 50 comprises reflective scanner 100 which comprises a transparent platen 110 against which the document to be scanned is placed. Scanner 100 generally comprises a cover (not shown) or similar device that is placed over an opaque document prior to performing a reflective scan.

A transparent media adapter 120 may be used in conjunction with reflective scanner 100 to enable reflective scanner 100 to scan images on a transparent media object 170 such as a photographic negative or slide. A template 150 may be used to properly position transparent media object 170 against platen 110. Template 150 may be dimensioned such that it fits securely within recessed edges 115 of reflective scanner 100 around platen 110. Template 150 may include one or more insert areas 160 for accommodating one or more transparent media objects 170 therein. Template 150 may include one or more alignment elements 155A-155D, such as recessions, ridges or apertures, that are engaged with positioning elements 125A-125C on adapter 120 to facilitate proper alignment and positioning of adapter 120 on template 150.

In order to scan transparent media object 170, template 150 is securely placed on platen 110 and transparent media object 170 is placed in insert area 160 of template 150. Transparent media adapter 120, positioned over template 150, produces a backlight that illuminates transparent media object 170 when the scanning operation is performed.

Computer 10 may be coupled to, and facilitate control of, scanner system 50 by a cable 15 via an external peripheral interface such as a parallel interface, a universal serial bus interface or other communications medium. Computer 10 typically includes one or more input devices, such as a keyboard 30 and a mouse 40, that enable user interaction therewith and facilitate user control of scanner system 50. One or more output devices, such as a monitor 20, a printer (not shown), or another device, may provide visual feedback for the user.

Figure 2:
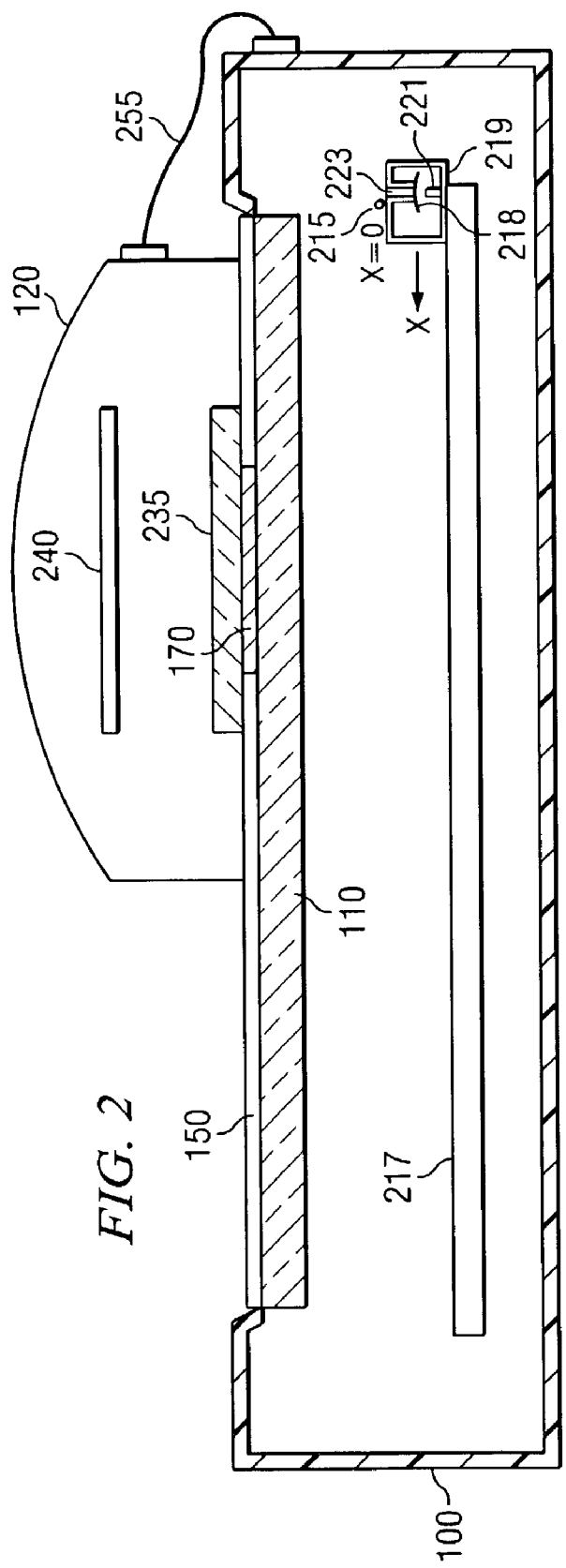
FIG. 2 is a cross-sectional side view of the scanner of FIG. 1 shown in a configuration for scanning an image on a transparent media.

In FIG. 2, a cross-sectional side view of reflective scanner 100 of FIG. 1 is shown in a configuration for scanning an image on a transparent media. Scanner 100 comprises an internal lamp 215 that is attached to a carriage 219 operable to impart a linear motion of the lamp along a rail 217 or other carriage guide structure. An optic device 218 may also be located within carriage 219 as well as a photosensitive device 221 which may comprise an array of charge-coupled devices (CCDs) or other photosensitive elements operable to perform optical-to-electrical conversion on incident light. A typical photosensitive device comprises hundred or thousands of individual photosensitive elements. Each photosensitive element is operable to generate a data set, e.g., a 16-bit, 20-bit, or another sample size, that numerically defines the light intensity incident on the respective photosensitive element. Carriage 219 may comprise a housing having a slot 223 that provides a light path through which light passes prior to being directed onto a surface of photosensitive device 221 by optic device 218. Generally, carriage 219 has a home position (X=0) from which scan operations are initiated.

Template 150 is properly positioned on platen 110 of scanner 100. Transparent media object 170 is secured within insert area 160 of template 150 and transparent media adapter 120 is placed on template 150. Transparent media adapter 120 preferably comprises an active illumination source, such as a lamp 240, for backlighting media object 170. Alternatively, a passive transparent media adapter without a backlight source may be used. Adapter 120 may include a translucent panel 235 for enabling light radiating from lamp 240 to pass through a bottom surface of adapter 120. Preferably, transparent media adapter 120 is detachably coupled to scanner 100 via one or more cables 255. Cable 255 may provide power for the lamp 240 and/or other electronic components of the adapter as well as a communication channel between adapter 120 and scanner 100. It is preferable that lamp 215 of carriage 219 is deactivated and adapter lamp 240 of transparent media adapter 120 is activated when scanning images on a transparent media. Light radiating from adapter lamp 240 will pass through translucent panel 235, through transparent media object 170 and through platen 110 whereupon it is passed through optic device 218 and focused onto photosensitive device 221.

Figure 3A:
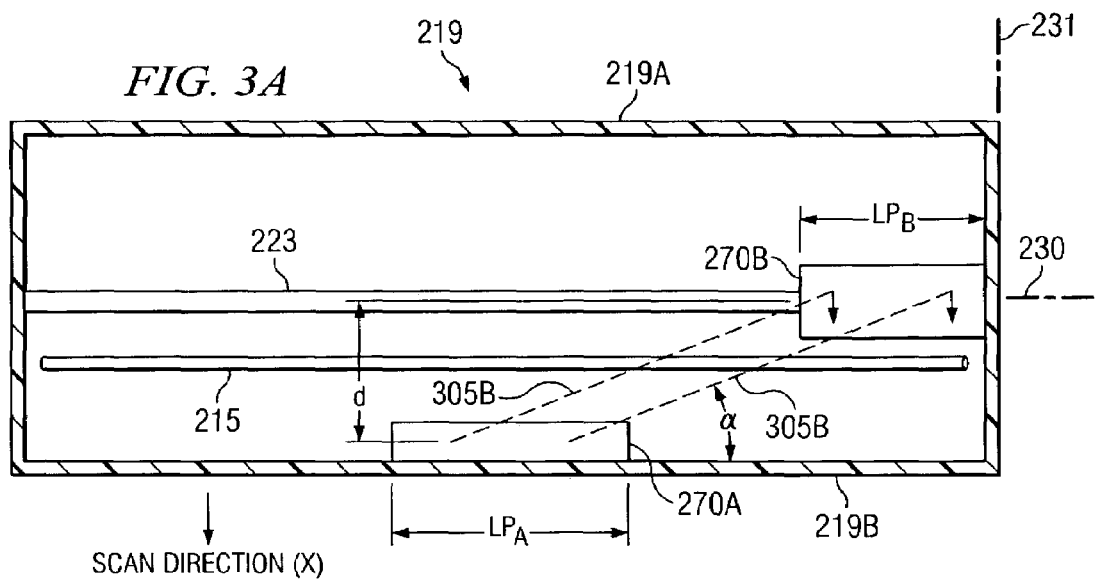
FIGS. 3A-3C are, respectively, a top schematic, a side-sectional schematic, and a front-sectional schematic of a carriage implemented according to an embodiment of the present invention.
Figure 3B:
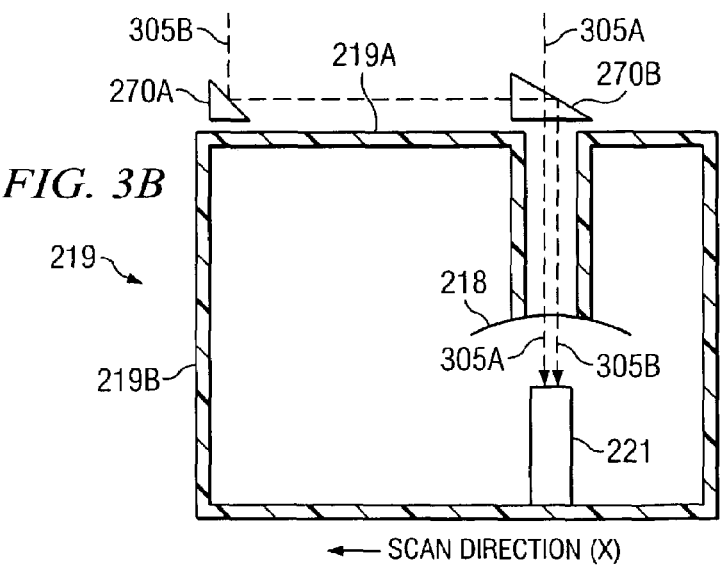
Figure 3C:
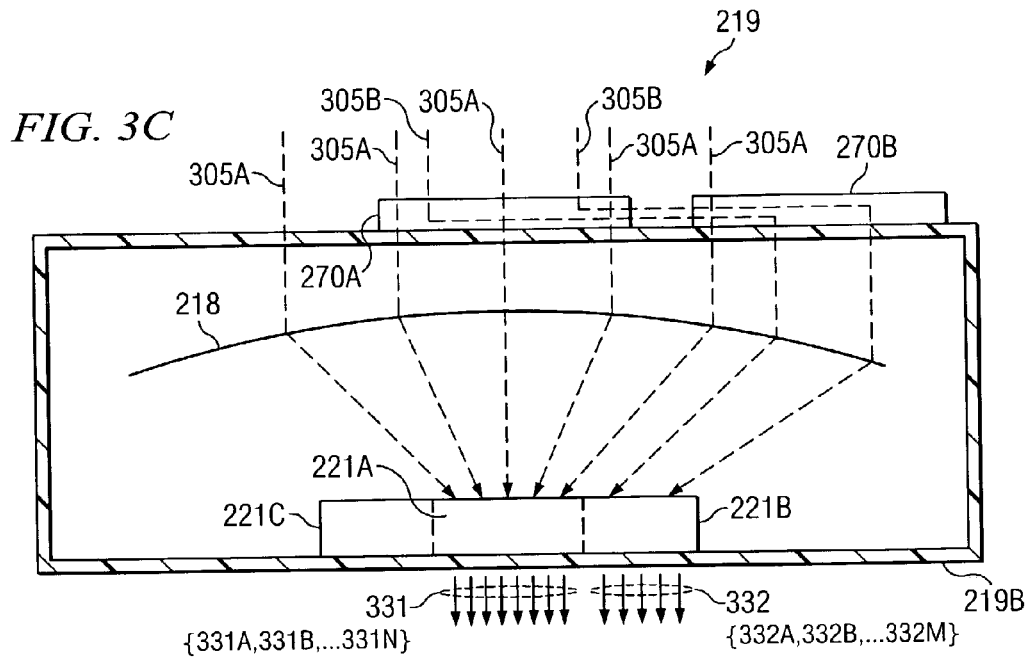

FIGS. 3A-3C are respectively a top schematic, a side-sectional schematic, and a front-sectional schematic of carriage 219 implemented according to an embodiment of the present invention. Slot 223 extends along a carriage top surface 219A substantially parallel with a transverse axis 230 of carriage 219. An anterior-posterior axis 231 of carriage 219 is generally aligned along a scan direction defined by the carriage translation direction (X). A light pipe comprising light pipe elements 270A and 270B (collectively referred to as light pipe 270) is disposed on a top surface 219A of carriage 219. In the particular arrangement illustrated, light pipe element 270A is located longitudinally forward of the light pipe element 270B and light pipe element 270B is located laterally from light pipe element 270A although other configurations of light pipe elements 270A and 270B are possible. Notably, light pipe element 270A is located longitudinally forward slot 223 by a distance d.

Figure 4:
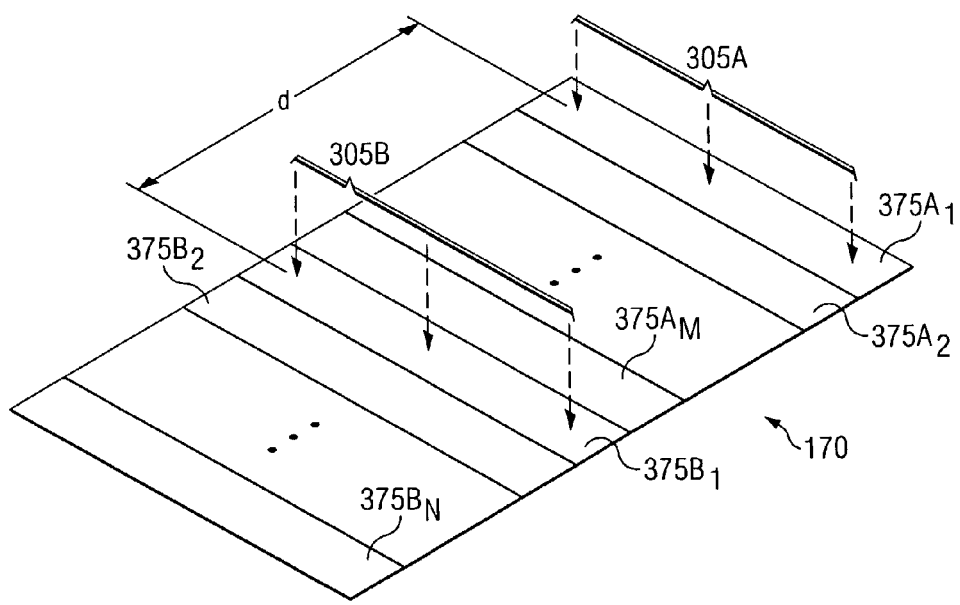
FIG. 4 is a media object schematic illustrating concurrent scanning of multiple scan lines in accordance with an embodiment of the present invention.

With reference also to FIG. 4, a primary scan line is sampled by passing light 305A through a first scan line $375A_1$ (also referred to herein as a primary scan line) of media object 170. The light 305A passes directly into slot 223 and onto optic device 218 after passage through scan line $375A_1$ and is thereafter focused onto medial region 221A of photosensitive device 221. Medial region 221A comprises a plurality of photosensitive elements that respec- tively perform optical-to-electrical conversion on the incident light. Each of the photosensitive elements of medial region 221A generates a respective sample 331A-331N of a data set 331 that numerically defines light 305A (and thus scan line $375A_1$). A secondary scan line $375B_1$ is sampled by passing light 305B through scan line $375B_1$ (located a distance d from the primary scan line $375A_1$) and into incidence with light pipe element 270A concurrently with sampling of primary scan line $375A_1$. Light pipe element 270A redirects light 305B to element 270B that, in turn, directs light 305B into slot 223. Optic device 218 focuses the redirected light from secondary scan line $375B_1$ (that is, light 305B) onto distal region 221B of photosensitive device 221. Distal region 221B comprises a plurality of photosensitive elements that respectively perform optical-to-electrical conversion on the incident light 305B. Each of the photosensitive elements of distal region 221B generates a respective sample 332A-332M of a data set 332 that numerically defines light 305B (and thus scan line $375B_1$)

As most clearly shown by FIG. 3B, light 305B is directed substantially orthogonal with top surface 219A of carriage 219. Upon incidence with light pipe element 270A, light 305B is redirected substantially parallel with top surface 219A until incident with light pipe element 270B. Light pipe element 270B is adapted to redirect light 305B into slot 223 for incidence with optic device 218. As most clearly illustrated in FIG. 3C, the redirected light 305B is focused onto distal region 221B of photosensitive device 221.

Preferably, light pipe 270 is detachably affixed to carriage top surface 219A although the light pipe may be permanently mounted thereto. In one embodiment, the light pipe comprises two elements 270A and 270B. In the illustrative embodiment, first light pipe element 270A is located on top surface 219A near a carriage anterior surface 219B. In general terms, light pipe element 270A is disposed in a forward position on carriage 219 with respect to slot 223. Light pipe 270 may comprise a reflective apparatus, such as a configuration of mirrors, operable to capture light and redirect the captured light onto at least one of photosensitive device distal regions 221B and 221C. Other implementations of light pipe 270 are possible. For example, light pipe 270 may be implemented as an injection molded plastic structure(s), a configuration of prisms comprising optical grade glass, or another suitable device for capturing light directed thereon and redirecting the light to impinge on photosensitive device distal regions 221B and/or 221C.

In the illustrative example, light pipe element 270A is adapted to receive light directed thereon and redirect the received light at an offset (α) from a plane of the anterior surface 219B of carriage 219 such that the light redirected from light pipe element 270A impinges second light pipe element 270B. It should be noted that light pipe elements 270A and 270B may be of common or different lengths $L_{PA}$ and $L_{PB}$, respectively. In the case that light pipe elements 270A and 270B are of equal lengths, all light redirected from light pipe element 270A to light pipe element 270B will be redirected at a substantially equivalent offset α. However, in the case that light pipe element 270A is of a different length than light pipe element 270B, the offset α of redirection may vary along the length of light pipe 270A to facilitate incidence of the redirected light with light pipe element 270B. Light pipe 270B has redirection capabilities for directing light impinging thereon into slot 223. Light pipe element 270B is positioned on carriage surface 219A such that light directed onto element 270B is guided into slot 223, impinges optic device 218, and is focused on distal region 221B of photosensitive device 221. Accordingly, primary scan line data is obtained by sampling light 305A impinging medial region 221A that originates from directly above slot 223. Secondary scan line data is obtained by sampling light 305B that impinges light pipe element 270A, is redirected to element 270B, and is redirected into slot 223 thereby.

With reference now to FIGS. 2, 3A-3C, and 6, a procedure for scanning a media object 170 in accordance with an embodiment of the present invention is described. Carriage 219 is positioned at a scanning origination position, e.g., X=0 (FIG. 2), and lamp 240 of media adapter 120 is activated. The configuration of carriage 219 enables sampling of a scan line $375A_1$ by collecting light passing through scan line $375A_1$ and into slot 223 where the light is focused onto medial region 221A of photosensitive device 221. In general, the light collected by optics device 218 for sampling scan line $375A_1$ is directed substantially orthogonal to top surface 219A and into slot 223. A secondary scan line $375B_1$ is concurrently sampled with scan line $375A_1$ in accordance with embodiments of the invention. In the present example, light directed onto scan line $375B_1$ from lamp 240 is directed orthogonal to surface 219A and onto light pipe element 270A. Light pipe element 270A is adapted to redirect received light along a light path substantially parallel with surface 219A and into incidence with light pipe element 270B. Light pipe element 270B is adapted to receive light directed from element 270A substantially parallel with top surface 219A and redirect the light orthogonally with surface 219A through slot 223. Thus, light 305A passing through a first scan line $375A_1$ of media object 170 and into slot 223 is collected by optics device 218 and focused onto medial region 221A of photosensitive device 221. Concurrently, light passing through second scan line $375B_1$ of media object 170 is collected by light pipe 270 and directed onto a distal region 221B of photosensitive device. As carriage 219 is driven along rail 217, subsequent sets of scan lines, e.g., scan lines $375A_2$-$375A_M$ and $375B_2$-$375B_N$, are sampled in a similar manner. Imaging software is used to assemble the sampled scan lines $375A_1$-$375A_M$ and $375B_1$-$375B_N$ into a contiguous image.

It should be understood that the particular arrangement, implementation, and configuration of light pipe 270 with carriage 219 and photosensitive device 221 is exemplary only. While the illustrative embodiments provide a light pipe of two elements, a light pipe may be implemented from a single light pipe element or may comprise elements in excess of two components. Moreover, while the illustrative embodiments have described focusing light from a secondary scan line onto a distal region of a photosensitive device for concurrent sampling with another scan line by a medial region of the photosensitive device, it should be understood that the invention is not limited to such an implementation. For example, the light from the secondary scan line may be collected and directed towards two distal regions of a photosensitive device surrounding a medial region that provides samples of a primary scan line. It should further be understood that the particular areas of the photosensitive device that respectively sample the primary scan line and the secondary scan line can be modified by software and/or light pipe reconfigurations, and that in the most general terms, the present invention provides a method and mechanism of concurrently sampling two discrete scan lines of a media object with a single photosensitive device by directing the light from a first scan line to a region of the photosensitive device and concurrently directly light from the second scan line to different region of the photosensitive device.

What is claimed is:

1. A method of imaging a transparent media object, comprising:

passing light through a first scan line of the transparent media object;

focusing the light passed through the first scan line onto a first region of a photosensitive device, the first region extending along a transverse axis;

passing light through a second scan line of the transparent media object substantially concurrently with passage of the light passed through the first scan line; and focusing the light passed through the second scan line onto a second region of the photosensitive device, the second region being offset alone the transverse axis from the first region.

2. The method according to claim 1, further comprising redirecting the light passed through the second scan line prior to focusing the light on the second scan region.

3. The method according to claim 1, wherein focusing light onto a first region of the photosensitive device further comprises focusing the light onto a medial region of the photosensitive device.

4. The method according to claim 1, wherein focusing light on the second region further comprises focusing the light onto a distal region adjacent a medial region.

5. The method according to claim 1, further comprising driving a scanner carriage comprising the photosensitive device through a translation motion in a scan direction.

6. The method according to claim 5, further comprising redirecting the light passed through the second scan line obliquely with the scan direction.

7. The method according to claim 1, further comprising sampling the light focused on the first and second regions by the photosensitive device.

8. The method according to claim 5, further comprising directing the light passed through the first and second scan lines through a carriage slot.

9. A scanner system for imaging a transparent media object, comprising:

an illumination source for concurrently illuminating first and second scan lines of a media object; and a carriage comprising a photosensitive device located within the carriage and a light pipe affixed to the carriage, the carriage configured to receive on a first region of the photosensitive device light passed through the first scan line, the light pipe adapted to redirect light passing through the second scan line onto a second region of the photosensitive device, the photosensitive device operable to sample light directed onto the first and second regions.

10. The system according to claim 9, wherein the illumination source is disposed within a transparency media adapter.

11. The system according to claim 9, wherein the carriage further comprises a slot through which light of the illuminated first and second scan lines pass.

12. The system according to claim 9, wherein the light pipe comprises first and second light pipe elements.

13. The system according to claim 12, wherein the first light pipe element is adapted to receive the light passing through the second scan line and redirect the received light to the second light pipe element.

14. The system according to claim 13, wherein the second light pipe element is adapted to redirect light received from the first light pipe element into a slot of the carriage.

15. The system according to claim 9, wherein the light pipe further comprises first and second light pipe elements, the first light pipe element longitudinally disposed forward the second light pipe element on a carriage surface with respect to a scan direction.

16. The system according to claim 15, wherein the first light pipe element redirects the light passed through the second scan line obliquely from a scan direction of the carriage.

17. The system according to claim 9, wherein the light pipe further comprises first and second light pipe elements, the second light pipe element laterally disposed from the first light pipe element on a surface of the carriage.

18. The system according to claim 9, wherein the light pipe comprises an injection-molded plastic apparatus.

19. The system according to claim 9, wherein the carriage further comprises a slot through which the light passed through the first scan line is directed, the light redirected by the light pipe passing through a different area of the slot than the light passed through the first scan line.

20. The system according to claim 9, wherein the first region comprises a medial region and the second region comprises a region adjacent to the medial region.

\* \* \* \* \*

UNITED STATES PATENT AND TRADEMARK OFFICE
CERTIFICATE OF CORRECTION

| | | |
|---|---|---|
| PATENT NO. | : 7,298,529 B2 | Page 1 of 1 |
| APPLICATION NO. | : 10/455845 | |
| DATED | : November 20, 2007 | |
| INVENTOR(S) | : William R. Haas et al. | |

It is certified that error appears in the above-identified patent and that said Letters Patent is hereby corrected as shown below:

In column 6, line 14, in Claim 1, delete "alone" and insert -- along --, therefor Signed and Sealed this Seventeenth Day of June, 2008

JON W. DUDAS
*Director of the United States Patent and Trademark Office*